United States Patent [19]
Poling et al.

[11] Patent Number: 5,868,185
[45] Date of Patent: Feb. 9, 1999

[54] FOLDING WORKBENCH SYSTEM

[75] Inventors: Douglas E. Poling; James P. Ciarpello, both of Catonsville, Md.

[73] Assignee: DEP Industries, Inc., Catonsville, Md.

[21] Appl. No.: 16,432

[22] Filed: Jan. 30, 1998

[51] Int. Cl.$^6$ ................................................. B27H 1/00
[52] U.S. Cl. .................... 144/286.5; 144/1.1; 144/286.1; 108/11; 269/901; 83/486.1; 83/574
[58] Field of Search .......... 83/471, 485, 486.1, 83/574; 144/2.1, 286.1, 286.5; 269/901; 108/11, 12

[56] References Cited

U.S. PATENT DOCUMENTS

| | | | |
|---|---|---|---|
| 3,123,108 | 3/1964 | Gaskell et al. | 83/486.1 |
| 4,161,974 | 7/1979 | Patterson | 144/286.1 |
| 4,576,076 | 3/1986 | Pyle | 83/486.1 |
| 4,909,491 | 3/1990 | Cheng | 269/901 |
| 5,065,989 | 11/1991 | Ho | 269/901 |
| 5,303,755 | 4/1994 | Poling | 83/574 |
| 5,630,455 | 5/1997 | Jullen | 144/286.5 |

*Primary Examiner*—W. Donald Bray
*Attorney, Agent, or Firm*—Rosenberg, Klein & Bilker

[57] ABSTRACT

A folding workbench system (100) is provided which includes a main support member (102) to which a plurality of leg members (104, 106, 108 and 110) are hingedly coupled on opposing ends thereof. A work piece support platform (120) is pivotally coupled on opposing ends thereof to one pair of legs (104, 108) and slidingly engaged within a slotted opening (130) in each of the other leg members (106, 110). A power tool (174) is coupled to a power tool support (150) that is slidingly coupled to the main support member (102). The tool support (150) includes a turret (156) coupled to the main slide (152) and a vertical height adjustment assembly (180) coupled to the turret (156).

21 Claims, 7 Drawing Sheets

FOLDING WORKBENCH SYSTEM

BACKGROUND OF THE INVENTION

1. Field of the Invention

This invention pertains to workbench systems which permit a variety of operations to be accomplished such as cutting, drilling, routing, sanding, planing, etc. In particular, this invention is directed to a portable workbench system which is foldable into a compact state to allow easy transport and storage. More in particular, this invention directs itself to a folding workbench system which includes a main support member having at least a pair of legs hingedly coupled to opposing ends thereof. The main support member and legs form an A-frame type structure between which a work piece support platform is disposed. Further, this invention relates to a workbench system which includes a power tool support assembly which adjustably positions a power tool relative to the work piece support platform. Still further, the power tool support assembly of the invention provides for both rotational and vertical positioning of the power tool relative to the work piece support platform. Yet more in particular, this invention includes a plurality of support links which telescopically extend from the work piece support platform to each of the respective legs for providing a stable support platform onto which work pieces may be supported during the machining thereof.

2. Prior Art

Workbench systems of a portable nature are known in the art, as are knock-down workbenches for use with power tools. The closest prior art known to the Applicant include Applicant's own U.S. Pat. No. 5,303,755 and U.S. Pat. Nos. 5,165,317; 4,161,974; 4,494,431; 4,133,237; 4,958,544; 4,465,114; 4,827,819; 3,727,505; 2,803,271; 4,281,570; 3,734,151; 4,681,305; 4,265,283; 4,807,506; and, 4,934,423.

In such systems as Applicant's prior patented workbench system disclosed in U.S. Pat. No. 5,303,755, an A-frame type structure is utilized to support a power tool in either a position above a work piece platform or below it. While such system provided great utility, it was found to have several features which were disadvantageous. The power tool support provided vertical, lateral and rotational adjustment, however, such was not independently adjustable. When the mounting mechanism was loosened to provide an adjustment laterally, vertically, or angularly, such affected the other adjustments. Thus, if one intended to change the height of the power tool, the loosening of the support also allowed for lateral displacement and rotation thereof, making an accurate positioning difficult. Further, while the structure was sufficiently light to be considered portable, it could not be put into a compact form without knocking it down, which took a considerable amount of time. All of the above mentioned deficiencies have been overcome by the instant invention.

SUMMARY OF THE INVENTION

A folding workbench system for supporting a power tool above a work piece is provided. The folding workbench system includes a main support member and a power tool support slidingly coupled to the main support member, the power tool support includes an assembly for releasably lockingly fixing a position thereof on the main support member. The folding workbench system also includes a plurality of longitudinally extended leg members coupled to the main support member, a first pair of the plurality of leg members being pivotally coupled to the main support member adjacent one end thereof and a second pair of the plurality of leg members being pivotally coupled to the main support member adjacent an opposing end thereof. The folding workbench system also includes a work piece support coupled on opposing ends to the first and second pairs of leg members. The work piece support is pivotally coupled on one side of the opposing ends thereof to a first leg member of each of the first and second pairs of leg members, the work piece support being slidingly coupled on another side of the opposing ends thereof to a respective second leg member of each of the first and second pairs of leg members. The folding workbench system further includes a plurality of support links releasably coupled between each of the sides of the work piece support and a respective leg member of the plurality of leg members, wherein the workbench system is folded by pivotally displacing the first and second leg members toward each other while slidingly displacing the work piece support with respect to the second leg members subsequent to releasing the support links.

DESCRIPTION OF THE PREFERRED EMBODIMENT

Referring to FIGS. 1–12, there is shown folding workbench system 100 for operatively supporting a power tool 174 above a work piece. Folding workbench system 100 provides a portable system which permits various power tool operations to be carried out on a work piece at any on-site location. While the power tool 174 is depicted as a radial arm type circular saw, it should be understood that various other power tools may be coupled to the power tool support 150 without departing from the inventive concept disclosed herein, such as circular saws, panel saws, jigsaws, drills, routers, planers, sanders and the like.

Figure 1:
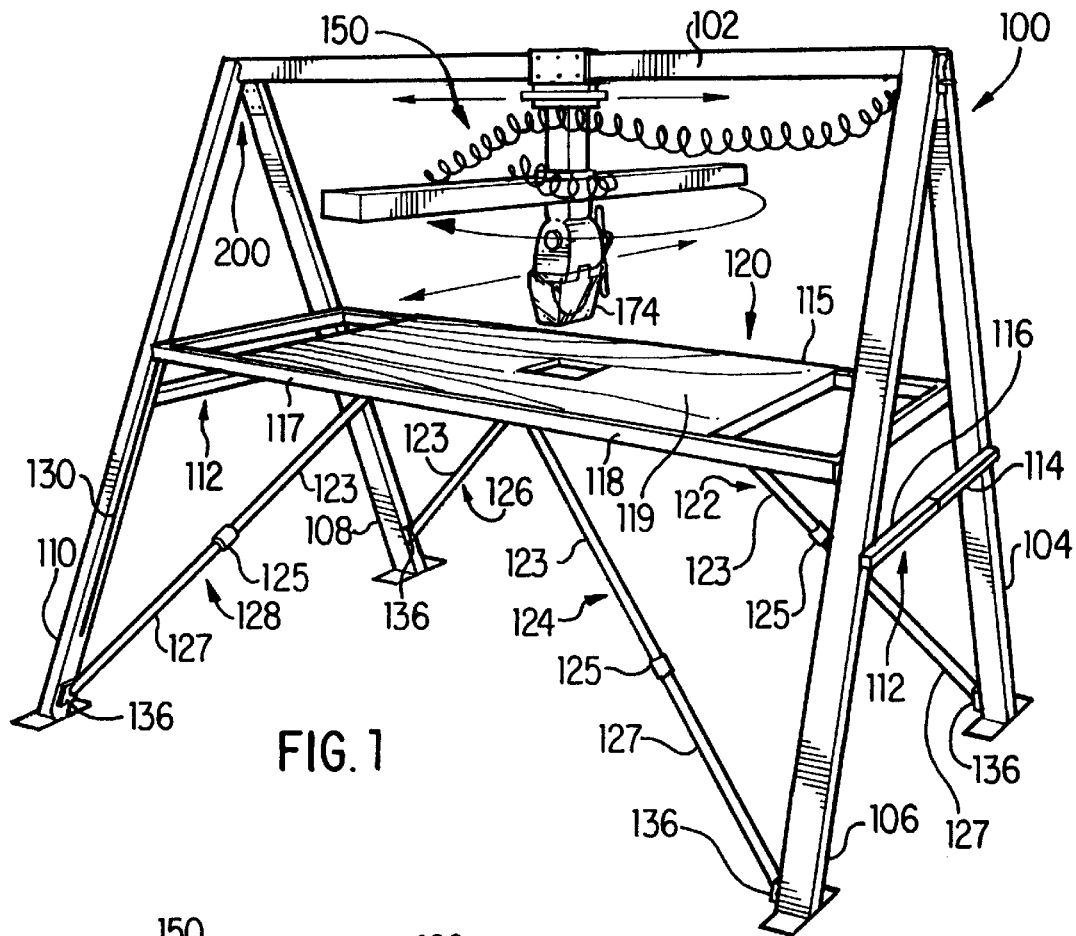
FIG. 1 is a perspective view of the present invention in an operable state.

Positioned for operative use, as shown in FIG. 1, folding workbench system 100 includes a main support member 102 to which a power tool support 150 is slidingly coupled. As will be discussed in following paragraphs, the power tool support includes the means by which such is releasably lockingly fixed in a selected position on the main support member 102, with the power tool support 150 being adjustable both vertically and rotatively to position the power tool 174 at a predetermined position relative to a work piece. The work piece (not shown) is supported on a work piece support platform 120. Work piece support platform 120 includes a work piece support frame 118 on which a panel member 119 is supported. A work piece is then positioned on the platform for cutting, drilling, routing, etc. In order to accurately perform such operations on a work piece, the work piece must be stably supported and the power tool 174 must be stably and accurately positioned with respect to the work piece. System 100 provides for both the stable support of the work piece and the stable and accurate positioning of the power tool 174.

The stability of supporting the work piece is provided first by the stable structure which defines the framework of system 100. The main support member 102 is coupled to at least four leg members 104, 106, 108 and 110, with at least one pair of leg members 104, 106 being located adjacent one end of main support member 102 and another pair of leg members 108, 110 being positioned adjacent an opposing end of main support member 102. Each of the pairs of leg members 104, 106 and 108, 110 are hingedly coupled on one end thereof to the main support member 102 and extend angularly therefrom with the opposing end of each leg member interfacing and lying contiguous with a base surface. Displaced vertically from an apex formed by each of the pair of legs 104, 106 and 108, 110 there is provided a folding link 112, the combination defining an A-frame type support on each end of the main support member 102. Also displaced vertically from the apex of each of the pairs of legs 104, 106 and 108, 110 is the work piece support frame 118, which is coupled on opposing ends to each of the pairs of legs 104, 106 and 108, 110.

To further add to the rigidity of the work piece support platform 120, a plurality of support links 122, 124, 126 and 128 are coupled between the work piece support frame 118 and each of the respective leg members 104, 106, 108 and 110. By that arrangement, large loads can be supported on platform 120, with a lightweight structure which is easily transported by construction personnel. Depending upon the particular application to which system 100 is to be applied, although not important to the inventive concept described herein, the structural elements of system 100 may be tubular or solid and formed of substantially rigid material compositions, such as wood, steel, aluminum, engineering plastic compositions, or like materials having sufficient structural integrity to accept the expected loads for a given application.

Figure 8:
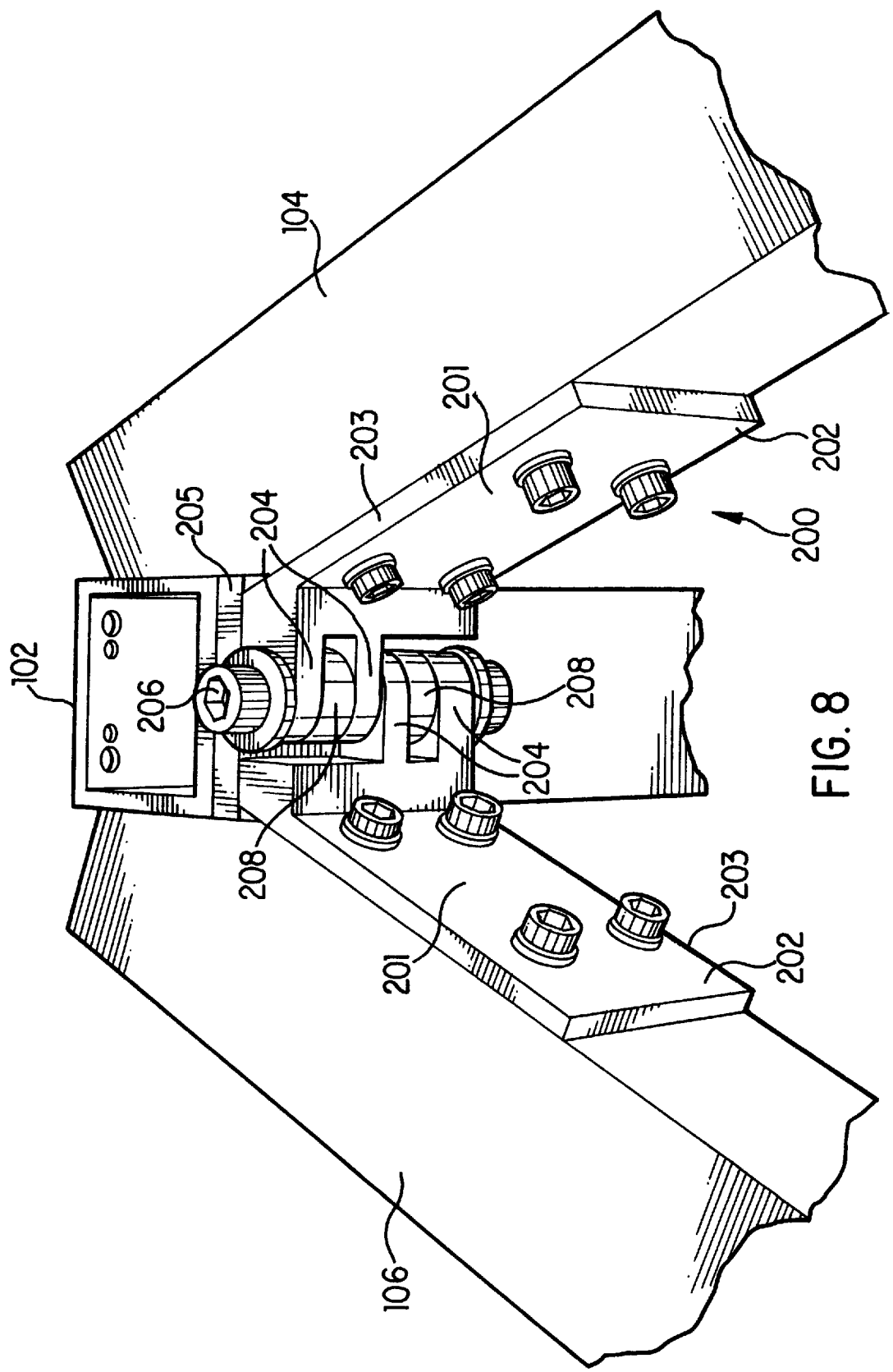
FIG. 8 is an enlarged sectional view of a hinge assembly of the present invention.

Each of the pairs of legs 104, 106 and 108, 110 are coupled to respective ends of main support member 102 by respective hinges 200. As shown in FIG. 8, each hinge 200 is defined by a pair of hinge plates 202, each hinge plate 202 being secured to a respective leg member 104, 106, for example. Although the hinge plates 202 are depicted as being coupled to respective leg members 104, 106 by a plurality of fasteners, other means of securement, such as welding, riveting, adhesive bonding, etc. may be utilized. In fact, the operative portion of the hinge plates 202, the knuckles 204, may be machined or otherwise integrally formed as part of each leg member.

Each of the hinge plates 202 include a pair of parallel spaced knuckles 204 which are angularly offset from the planar body portion 201 of hinge plate 202, as the knuckles 204 are located adjacent one edge 203 of the hinge plate 202. By that arrangement, it is not necessary to manufacture a different hinge plate for use on a left leg from that for use on a right leg, as the offset location of the knuckles 204 permit hinge plate 202 to be used on any of leg members 104, 106, 108 or 110. Each of the pair of knuckles 204 of a respective hinge plate 202 are disposed in alignment and positioned on opposing sides of a respective one of a pair of knuckles 208 which extend from the main support member 102. The knuckles 208 may be integrally formed at a lower side of the main support member 102, or formed as part of a knuckle plate 205 which in turn is coupled to the lower side of main support member 102. Each of the knuckles 204 and 208 have through openings disposed in aligned relationship through which the hinge pin 206 extends, as is conventional in the art.

Each of the folding links 112 are formed by a first link 114 which is pivotally coupled on a first end thereof to a respective leg member, and a second link having a first end pivotally coupled to a second end of the first link 114 and an opposing second end pivotally coupled to the other of the pair of leg members on a respective end of the main support member 102. By that arrangement, when the two links 114 and 116 are angularly displaced, one with respect to the other, such permits the respective leg members 104, 106 and 108, 110 to be displaced toward each other subsequent to the support links 122, 124, 126 and 128 being prepared for such folding as will be described in following paragraphs.

In order for the legs 104 and 106, 108 and 110 to be displaced toward each other, the work piece support frame 118 must also be displaceable. One side 115 of frame 118 is pivotally coupled on opposing ends thereof to each of the respective leg members 104 and 108. The opposing side 117 of frame 118 is slidably coupled to each of the respective leg members 106 and 110. Each of leg members 106 and 110 are formed with a longitudinally extended slotted opening 130 for receiving a respective projecting portion of frame 118 therein. As seen in detail in FIG. 9, a projection 134 extends from an end of frame 118 adjacent the side 117 thereof. Projection 134 is slidingly disposed within the longitudinally extended slotted opening 130 of a respective leg member, such as leg member 106, depicted in the drawing of FIG. 9. At the upper end of the slotted opening 130, there is a transverse slotted portion 132 into which the projection 134 extends when the respective leg members 104, 106 and 108, 110 are in their unfolded positions, as shown in FIG. 1. By that arrangement, the projections 134 extending from frame 118 rest on a lower edge of a respective transverse slotted portion 132 formed in each of the leg members 106 and 110 when the leg members are spread in their operative position.

Figure 6:
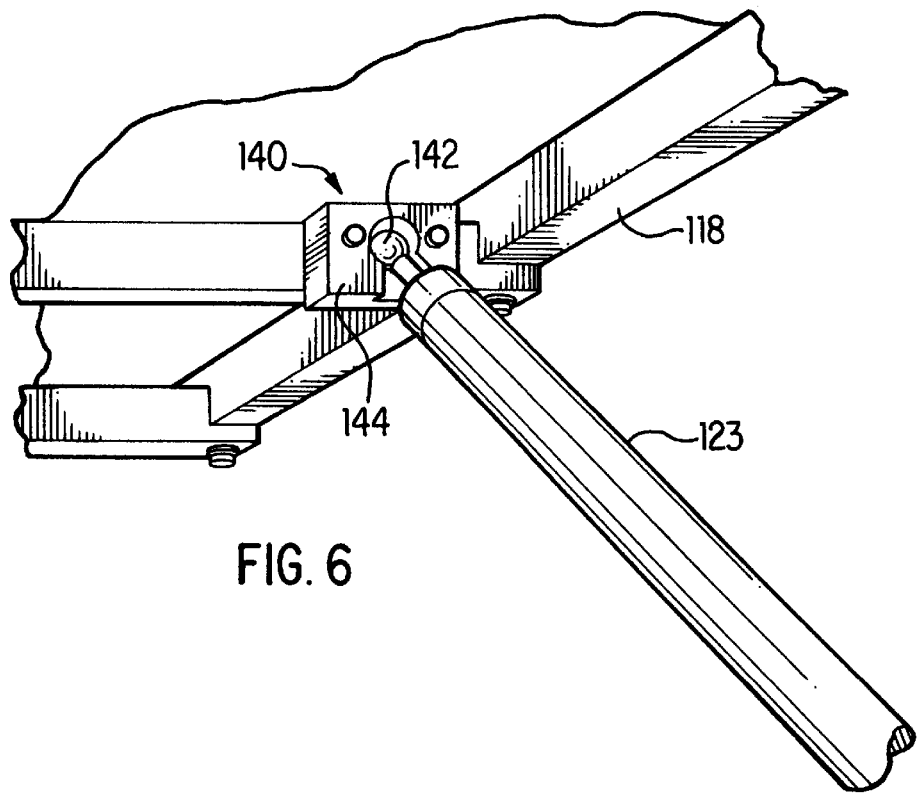
FIG. 6 is an enlarged sectional perspective view of the pivotal coupling of a support link of the present invention.

Each of the support links 122, 124, 126 and 128 are formed by an upper section 123 telescopically coupled to a lower section 127. Upper section 123 is a tubular member having a bore into which the lower section 127 is slidingly engaged. When the lower section 127 is extended from within the bore of the upper section 123, such is releasably secured in such position by a compression coupling 125. The formation of a compression coupling at the end of the tubular upper section 123 is well known in the art and will not be further described herein. As shown in FIG. 6, the distal end of the upper section 123 has a ball 142 formed thereon and forms one part of a pivotal ball joint 140. The ball joint 140 includes a socket 144 which captures the ball 142 therein and permits pivotal displacement of the upper section 123 with respect to the frame 118 in more than one plane.

Figure 7:
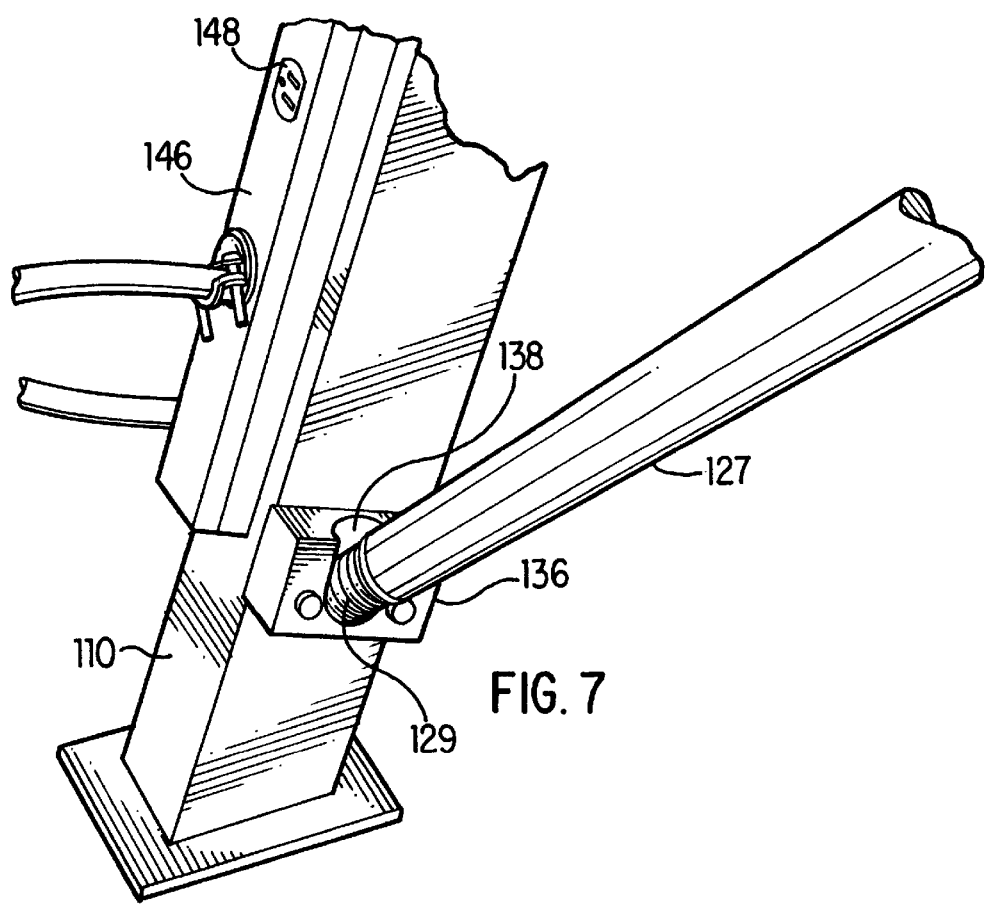
FIG. 7 is an enlarged sectional perspective view of a releasable coupling for a support link of the present invention.

The opposing end of each of the support links 122, 124, 126 and 128 is releasably captured within a recess opening 138 of a support holder 136, as shown in FIG. 7. The support holders 136 may be integrally formed or otherwise coupled to each of the respective leg members 104, 106, 108 and 110 with a recess opening 138 for receiving the distal end 129 of a respective support link lower section 127 therein. Thus, when it is desired to fold the structure of system 100, the compression couplings 125 of each of the support links 122, 124, 126 and 128 are loosened and the lower sections 127 are retracted into the respective upper sections 123 so that the distal ends 129 are removed from the respective recess openings 138, thereby allowing the pivotal displacement of the support links.

Figure 11:
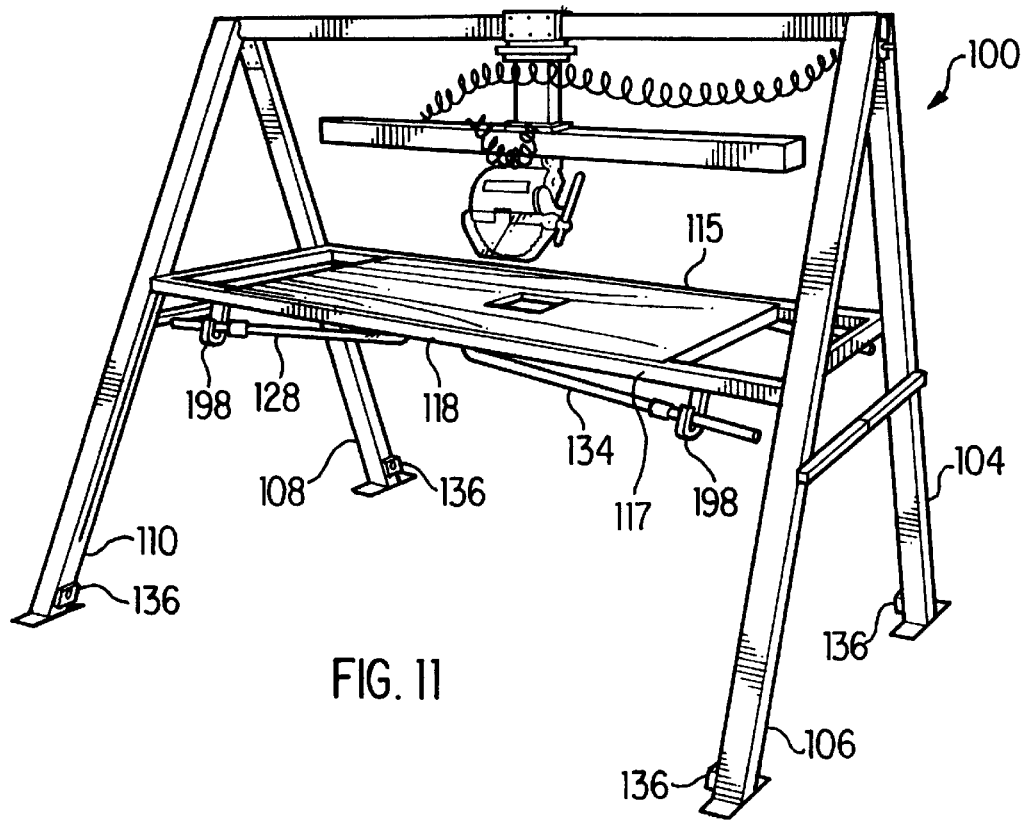
FIG. 11 is a perspective view of the present invention showing the support links in a retracted position; and, FIG. 12 is a perspective view of the present invention showing the support links arranged in an alternative retracted configuration.

As shown in FIG. 11, the work piece support frame 118 includes a plurality of hooks 198 extending therefrom on each side 115, 117 and disposed adjacent opposing ends thereof. Each of the support links 122, 124, 126 and 128 can then be pivotally displaced and supported by a respective hook 198 prior to folding of the A-frame structure. With the support links retracted and supported by a respective hook 198, the first and second links 114 and 116 of each of the pair of folding links 112 can be angularly displaced, substantially simultaneously displacing the leg members 104 and 106, 108 and 110 toward each other. That displacement causes the projections 134 of frame 118 to be displaced within the transverse slotted portions 132 of slotted openings 130 and then continue longitudinally downwardly as the leg members continue to be displaced toward one another, whereby system 100 achieves the compact folded state shown in FIG. 2.

Figure 12:
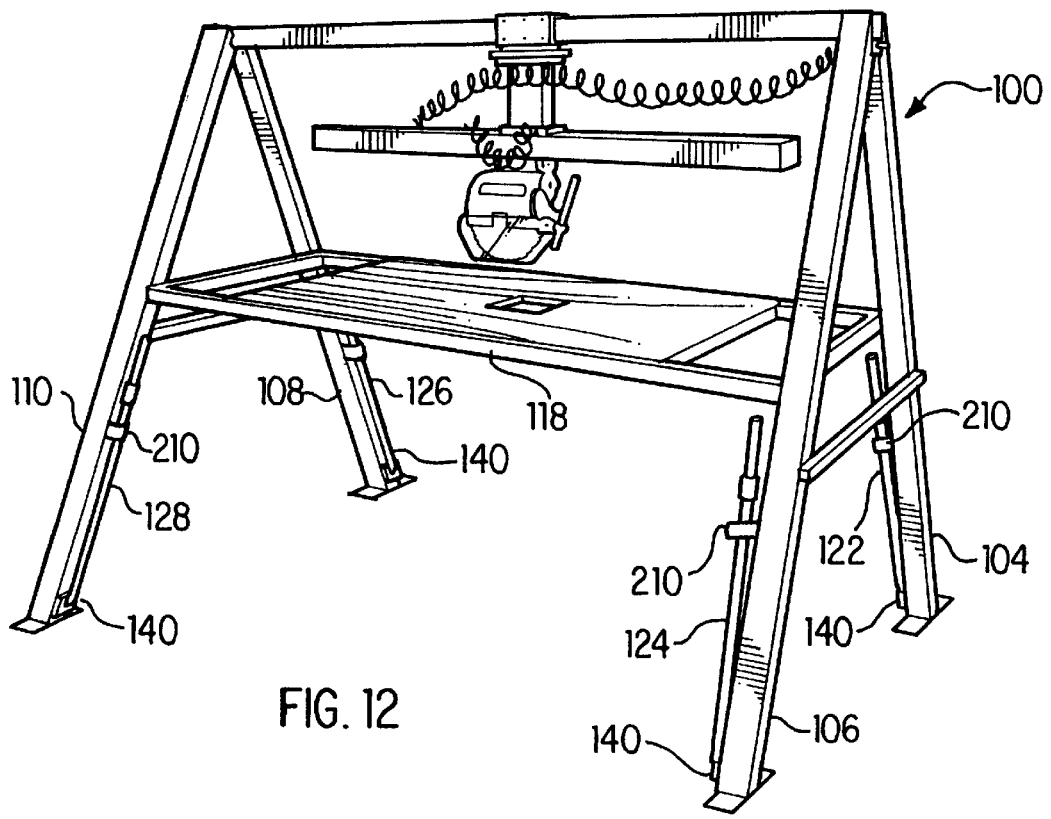

Alternately, the ball joints 140 may be disposed at the lower ends of each of the leg members 104, 106, 108 and 110, as shown in FIG. 12. The support holders, not shown, are located on the underside of the work piece support frame 118, in place of the sockets 144 shown in FIG. 6. Each of the leg members 104, 106, 108 and 110 are provided with a spring clip 110 for engaging a respective support link 122, 124, 126, 128. The spring clips 210 are disposed in front of the slotted openings 130 formed in leg members 206 and 210 so that the frame 118 is free to slide to the lower end of the slotted openings 130 as the pairs of legs are brought together to fold the structure.

Figure 2:
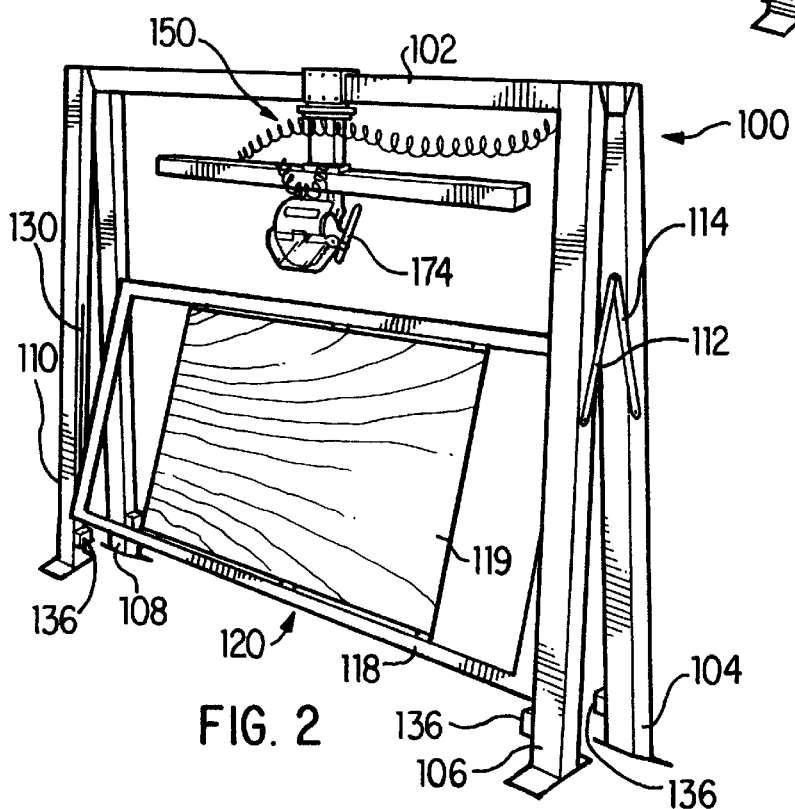
FIG. 2 is a perspective view of the present invention in a folded state.

In the folded condition, shown in FIG. 2, system 100 occupies a space which is less than one foot in depth, making it very easy to move from one job site to another and convenient for storage. In use, the power tool 174 can be conveniently energized through a power strip 146 having a plurality of outlets 148. The power strip 146 is secured to one of the leg members, such as leg member 110, and provides a sufficient number of outlets 148 to simultaneously connect a number tools other than power tool 174.

Figure 3:
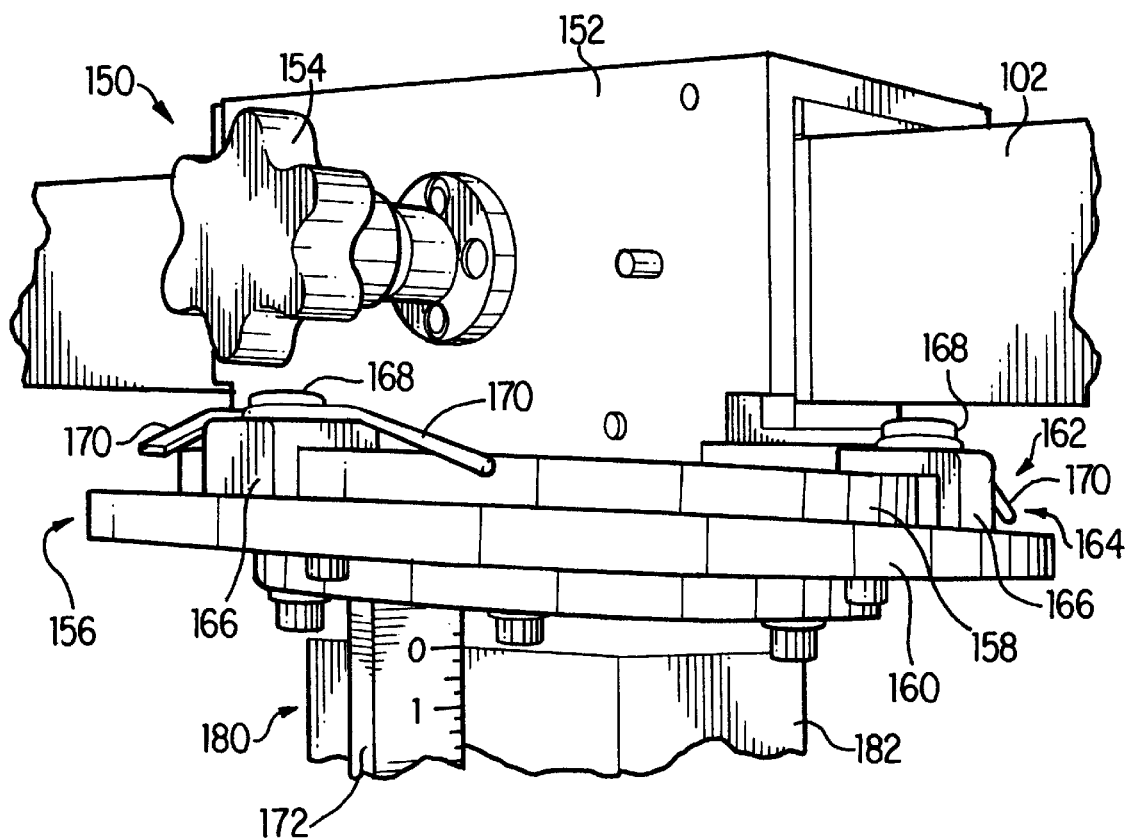
FIG. 3 is an enlarged sectional view of an upper portion of the power tool support assembly of the present invention.
Figure 9:
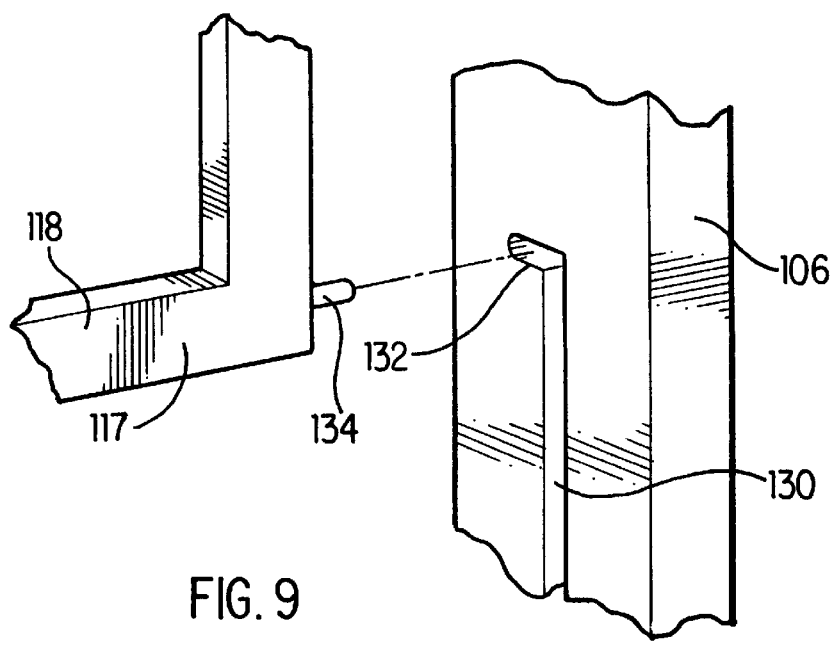
FIG. 9 is an enlarged perspective sectional view of a portion of the present invention.
Figure 5:
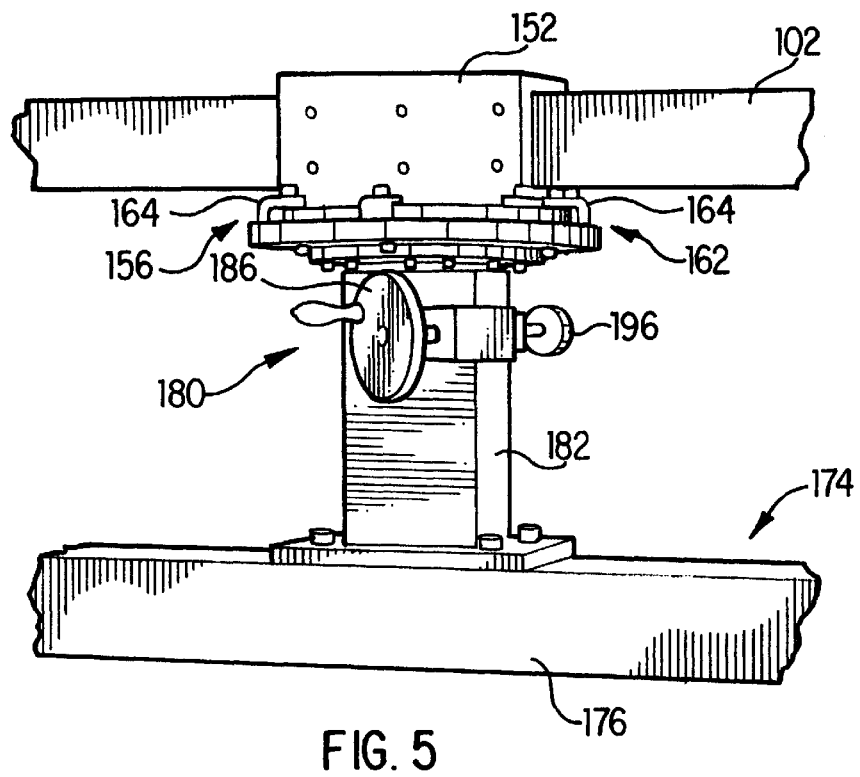
FIG. 5 is a sectional perspective view of the power tool support assembly.

The convenience, utility and accuracy with which power tools may be utilized with system 100 is further facilitated by the adjustability and structural arrangement of the power tool support 150. With particular reference to FIGS. 3 and 5, the slidable coupling of power tool support 150 is provided by a main slide 152 having a tubular configuration through which the main support member 102 passes. Main slide 152 may interface with main support member 102 through low friction slides or rollers, not important to the inventive concepts described herein. A releasable locking assembly 154 is secured to main slide 152 and provides for clamping engagement with the main support member 102 responsive to a rotative displacement of a hand wheel portion of the releasable locking assembly 154. By clamping main slide 152 to main support member 102, the position of power tool support is fixed relative to the work piece support platform 120.

The power tool support 150 includes a vertical adjustment assembly 180 which is coupled to the power tool 174 on one end thereof and coupled to the main slide 152 through a turret 156. By that arrangement, the power tool support 150 is positioned at a desired location along the length of main support member 102 and turret 156 provides for angular displacement of the power tool relative to a vertically directed axis defined thereat. The vertical adjustment assembly 180 then provides for height adjustment of the power tool 174 relative to the work piece support platform 120 and the work piece which is supported thereby.

Figure 10:
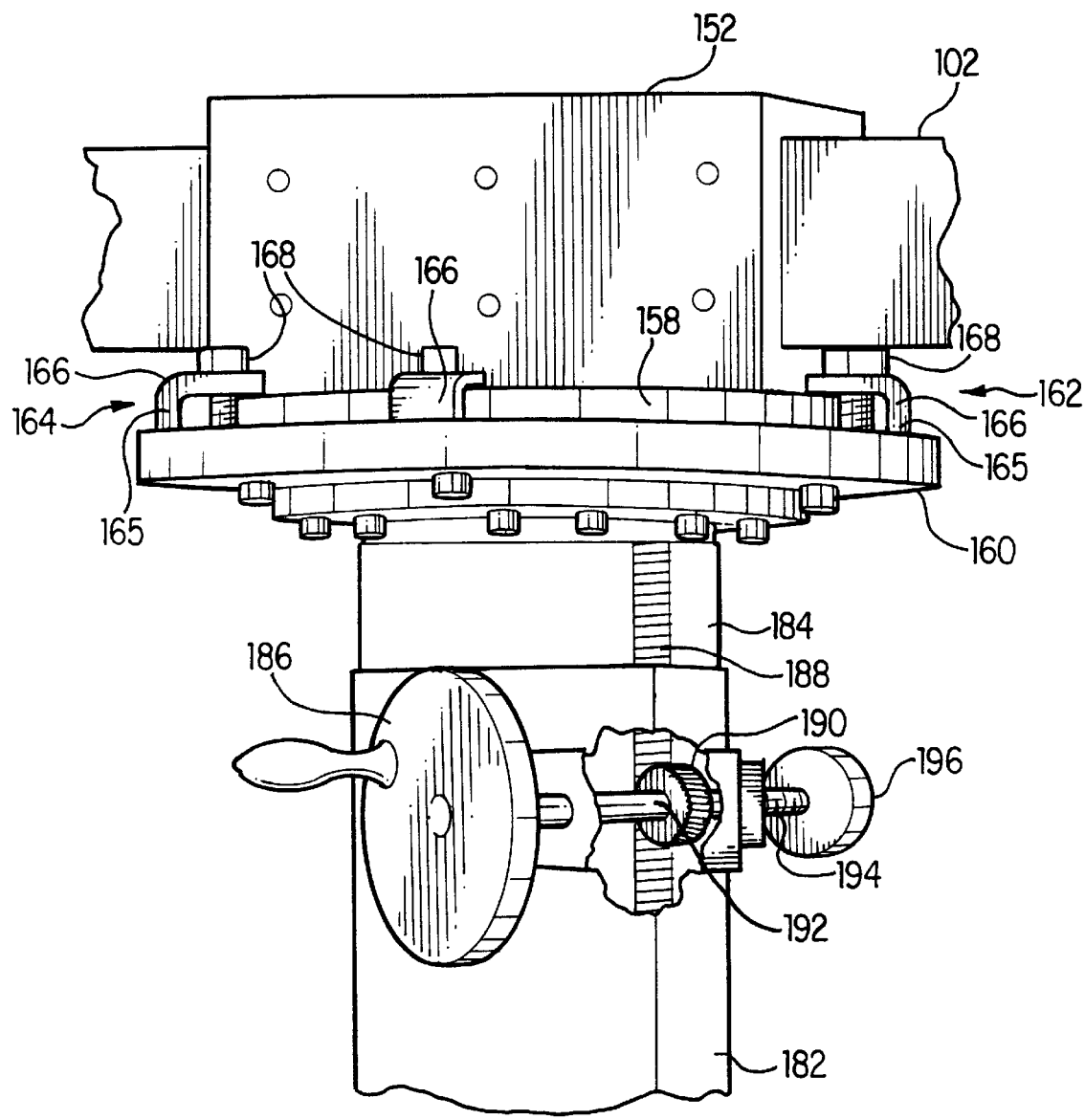
FIG. 10 is an enlarged perspective view, partially cut away, of the power tool support of the present invention.

Referring further to FIG. 10, the vertical adjustment assembly 180 is shown to include a first member 182 telescopically engaged with a second member 184. Second member 184 is secured to the lower turret plate 160 and extends through the longitudinally extended bore of the tubular first member 182. A toothed rack 188 extends longitudinally along second member 184 and is affixed thereto. A gear 190 is rotatably coupled to the first member 182 and engaged with the toothed rack 188. Gear 190 is secured to a shaft 192 for rotation therewith, one end of the shaft 192 extended through an aperture formed in first member 182 for coupling to a hand wheel 186. Thus, by rotation of hand wheel 186, the gear 190 can climb or descend along the rack 188, thereby vertically displacing the first member 182 upwardly or downwardly. Thus, with a drill being coupled to the lower end of first member 182, the hand wheel 186 can be rotated to displace first member 182 and the drill therewith to operate such as a drill press. For the operation of other power tools, it is usually desired to select a vertical position therefor and maintain such during the operations to be performed. In that regard, means for releasably fixing the vertical position of the first member relative to the second member is provided by a threaded shaft 194 which is threadedly engaged with first member 182 through a threaded aperture formed therein. One end of shaft 194 is coupled to a hand wheel 196, wherein the user can rotate the hand wheel to displace the threaded shaft 194 relative to first member 182 to clampingly engage the second member 184 or disengage therefrom. The vertical adjustment assembly 180 may further include a scale 172 (shown in FIG. 3) having indicia inscribed thereon for indicating the displacement of first member 182 relative to second member 184.

Turret 156 includes an upper turret plate 158 secured to the main slide 152 and a lower turret plate 160 secured to the second member 184 of the vertical adjustment assembly 180 and pivotally coupled to upper turret plate 158. Thus, turret 156 is designed to allow lower turret plate 160 to rotate relative to upper turret plate 158. Turret 156 also includes means by which the angular position of lower turret plate 160 is releasably lockingly fixed in a position relative to upper turret plate 158 by a releasable engagement assembly 162. In order to provide such releasable locking, the releasable engagement assembly 162 includes a plurality of clamps 164. Although a single clamp 164 may be utilized to prevent the rotation of lower turret plate 160 relative to upper turret plate 158, it has been found that multiple clamps 164 provide greater stability, preventing rocking of the vertical adjustment assembly 180 about the pivotal coupling of lower turret plate 160 to upper turret plate 158. Thus, three clamps 164 spaced at 120° intervals, or four clamps 164 spaced at 90° intervals provide for a more stable coupling arrangement. Either of lower turret plate 160 or upper plate 158 may be provided with indicia to indicate angular degrees of rotation relative to an index mark located on the other of turret plates 158 or 160.

Lower turret plate 160 is of a larger diameter than upper turret plate 158, however, it is not outside the scope of the instant invention to have the size of the turret plates interchanged, with the clamping members coupled therebetween in a corresponding manner. Each of the clamps 164 of the releasable engagement assembly 162 includes a clamping bar 166 extending between the lower turret plate 160 and the upper turret plate 158. Each clamping bar 166 has an L-shaped contour, with the short leg portion 165 interfacing with the turret plate of larger diameter and the longer leg extending over the turret plate of less diameter. Thus, in the arrangement shown, each clamping bar 166 has a short leg 165 which is in contact with the lower turret plate 160 and a longer leg portion extending over and contacting an upper surface of the upper turret plate 158.

Figure 4:
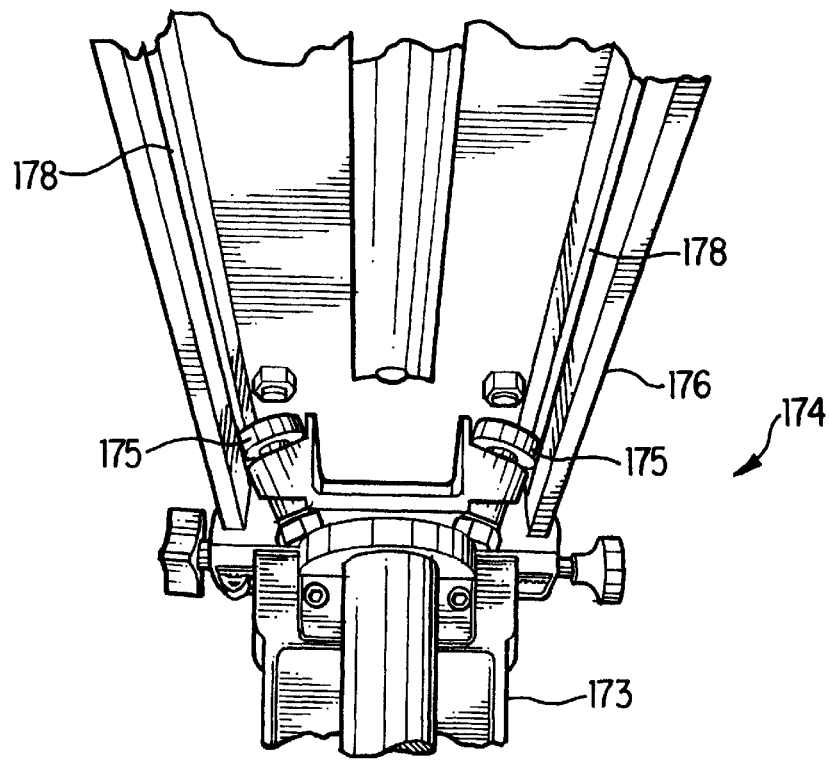
FIG. 4 is an enlarged sectional view of a portion of the power tool used with the present invention.

A threaded fastener 168 extends through an aperture formed in the longer leg of each clamping bar 166 and is threadedly engaged with the lower turret plate 160, through a threaded aperture formed therein, or other appropriate means. Therefore, when the threaded fastener 168 is tightened, the clamping bar 166 is pulled into tight engagement with both upper turret plate 158 and lower turret plate 160 to prevent rotative displacement of one relative to the other. For ease of use, the releasable engagement assembly 162 may further include a plurality of handles 170, each respectively coupled to a threaded fastener 168 to allow the loosening and tightening thereof without the necessity of a tool.

Where a power tool 174 is a radial arm saw, as shown in FIG. 1, the motorized portion or assembly 173, as shown in FIG. 4 is slidably mounted to a slide arm 176. The motor portion 173 includes a plurality of rollers 175 which are engaged to the slide arm 176 within respective grooves 178, formed in opposing sides thereof. Such coupling between the saw motor 173 and slide arm 176 is conventional and not described in any further detail herein. However, to take full advantage of the utility of folding workbench system 100, the slide arm 176 may be formed with a length that is two to three times that of conventional radial arm saws. The provision of a slide arm 176 of extended length provides great utility to users, allowing full cuts of large work pieces to be made without displacing the work on platform 120. In particular, the power saw 174 can be used to rip or crosscut full 4 ft.×8 ft. panels, to thereby function as a panel saw.

The slide arm 176, of a radial arm saw, or the housing of any other power tool is coupled to the lower end of the vertical adjustment assembly first member 182, whereby the power tool can be laterally positioned relative to the work piece support platform 120 by displacement of the main slide 152 on main support member 102, vertically adjusted by displacement of the vertical adjustment assembly first member 182 relative to the second member 184, and angularly positioned by rotation of the lower turret plate 160 relative to the upper turret plate 158. By the ability to rotate the turret 156 through 360°, even an exceptionally long slide arm 176 can be positioned in parallel relationship with the main support member 102 for folding system 100 into a compact state, as is shown in FIG. 2.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A folding workbench system for support ing a power tool above a work piece, comprising:
   a main support member;
   an power tool support slidingly coupled to said main support member, said power tool support including means for releasably lockingly fixing a position thereof on said main support member;
   a plurality of longitudinally extended leg members coupled to said main support member, a first pair of said plurality of leg members being pivotally coupled to said main support member adjacent one end thereof and a second pair of said plurality of leg members being pivotally coupled to said main support member adjacent an opposing end thereof;
   a work piece support coupled on opposing ends to said first and second pairs of leg members, said work piece support being pivotally coupled on one side of said opposing ends thereof to a first leg member of each of said first and second pairs of leg members, said work piece support being slidingly coupled on another side of said opposing ends thereof to a respective second leg member of each of said first and second pairs of leg members; and,
   a plurality of support links releasably coupled between each of said sides of said work piece support and a respective leg member of said plurality of leg members, wherein said workbench system is folded by pivotally displacing said first and second leg members toward each other while slidingly displacing said work piece support with respect to said second leg members subsequent to releasing said support links.

2. The folding workbench system as recited in claim 1 where each of said second leg members have a longitudinally extended slotted opening formed therein and said work piece support has a projection formed on each said opposing ends thereof slidingly received in a respective one of said slotted openings.

3. The folding workbench system as recited in claim 1 where said power tool support includes vertical adjustment means, said vertical adjustment means includes a first member having a bore extending longitudinally therethrough and a second member slidingly disposed within said through bore, said first member being coupled to a power tool and said second member being coupled to said means for releasably lockingly fixing a position of said power tool support.

4. The folding workbench system as recited in claim 3 where said power tool support includes a toothed rack affixed to said second member and extending longitudinally thereon, a gear engaged with said toothed rack and rotatably coupled to said first member, a hand wheel coupled to said gear for rotation therewith, and means for releasably fixing a position of said first member relative to said second member.

5. The folding workbench system as recited in claim 4 where said power tool support includes means for rotatably adjusting an angular position of said vertical adjustment means coupled between said second member and said means for releasably lockingly fixing a position of said power tool support.

6. The folding workbench system as recited in claim 5 where said means for rotatably adjusting includes an upper turret plate affixed to said means for releasably lockingly fixing a position of said power tool support, a lower turret plate affixed to said second member and pivotally coupled to said upper turret plate, and means for releasably engaging said upper turret plate to said second turret plate.

7. The folding workbench system as recited in claim 6 where said means for releasably engaging includes a plurality of clamps disposed in equidistant angularly spaced relationship.

8. The folding workbench system as recited in claim 7 where said lower turret plate is of larger diameter than said upper turret plate and each of said plurality of clamps includes a clamping bar coupled to a peripheral portion of said lower turret plate by a threaded fastener and extending to said upper turret plate for clamping engagement therewith.

9. The folding workbench system as recited in claim 1 where each of said plurality of support links have a first end pivotally coupled to a respective side of said work piece support and an opposing second end releasably coupled to a respective leg member.

10. The folding workbench system as recited in claim 9 where said first end of each of said plurality of support links has a ball formed thereon for coupling with a socket on a respective side of said work piece support.

11. The folding workbench system as recited in claim 1 further comprising a pair of folding links respectively coupled between said first and second pairs of leg members.

12. The folding workbench system as recited in claim 11 where each of said pair of folding links includes a first link pivotally coupled to one of said first and second leg members of a respective one of said first and second pairs of leg members and a second link pivotally coupled on one end thereof to said first link and pivotally coupled on an opposing end to the other of said first and second leg members of said respective pair of leg members.

13. A folding workbench system for supporting a power tool above a work piece, comprising:

a main support member;

a power tool support coupled to said main support member;

a plurality of longitudinally extended leg members coupled to said main support member, a first pair of said plurality of leg members being pivotally coupled to said main support member adjacent one end thereof and a second pair of said plurality of leg members being pivotally coupled to said main support member adjacent an opposing end thereof;

a work piece support coupled on opposing ends to said first and second pairs of leg members, said work piece support being pivotally coupled on one side of said opposing ends thereof to a first leg member of each of said first and second pairs of leg members, said work piece support being slidingly coupled on another side of said opposing ends thereof to a respective second leg member of each of said first and second pairs of leg members; and, a plurality of support links releasably coupled between each of said sides of said work piece support and a respective leg member of said plurality of leg members, wherein said workbench system is folded by pivotally displacing said first and second leg members toward each other while slidingly displacing said work piece support with respect to said second leg members subsequent to releasing said support links.

14. The folding workbench system as recited in claim 13 where said power tool support is slidingly coupled to said main support and includes means for releasably lockingly fixing a position of said power tool support on said main support member.

15. The folding workbench system as recited in claim 13 where each of said second leg members have a longitudinally extended slotted opening formed therein and said work piece support has a projection formed on each said opposing ends thereof slidingly received in a respective one of said slotted openings.

16. The folding workbench system as recited in claim 13 where each of said plurality of support links have a first end pivotally coupled to a respective side of said work piece support and an opposing second end releasably coupled to a respective leg member.

17. The folding workbench system as recited in claim 16 where said first end of each of said plurality of support links has a ball formed thereon for coupling with a socket on a respective side of said work piece support.

18. The folding workbench system as recited in claim 13 where each of said plurality of support links have a first end pivotally coupled to a respective leg member and an opposing second end releasably coupled to a respective side of said work piece support.

19. The folding workbench system as recited in claim 13 where each of said plurality of support links include a tubular upper section, a lower section telescopically received within said upper section, and means for releasably securing said lower section to said upper section.

20. The folding workbench system as recited in claim 13 further comprising a pair of folding links respectively coupled between said first and second pairs of leg members.

21. A folding workbench system for supporting a power tool above a work piece, comprising:

a main support member;

a power tool support coupled to said main support member;

a plurality of longitudinally extended leg members coupled to said main support member, a first pair of said plurality of leg members being pivotally coupled to said main support member adjacent one end thereof and a second pair of said plurality of leg members being pivotally coupled to said main support member adjacent an opposing end thereof; and, a work piece support coupled on opposing ends to said first and second pairs of leg members, said work piece support being pivotally coupled on one side of said opposing ends thereof to a first leg member of each of said first and second pairs of leg members, said work piece support being slidingly coupled on another side of said opposing ends thereof to a respective second leg member of each of said first and second pairs of leg members, wherein said workbench system is folded by pivotally displacing said first and second leg members toward each other while slidingly displacing said work piece support with respect to said second leg members.

* * * * *